T. C. SMITH.
CARRIAGE FOR CONVEYING DRUMS OF ELECTRIC CABLES.
APPLICATION FILED APR. 29, 1919.
1,436,733.
Patented Nov. 28, 1922.
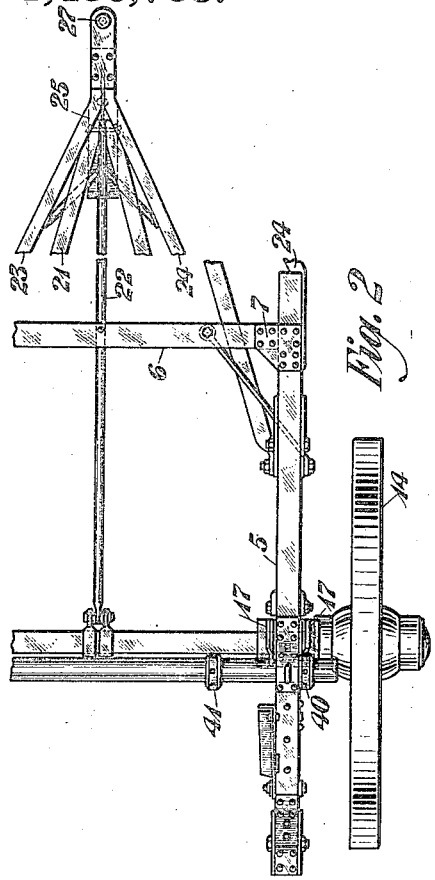
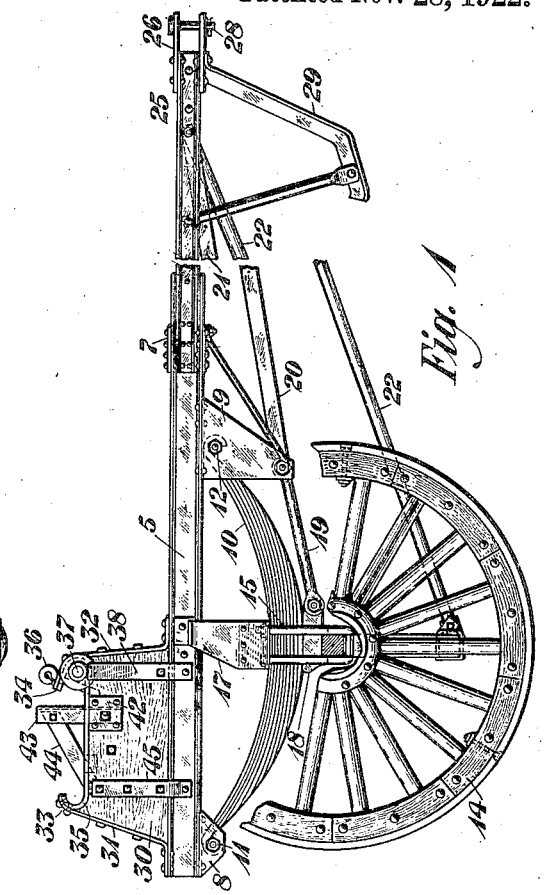
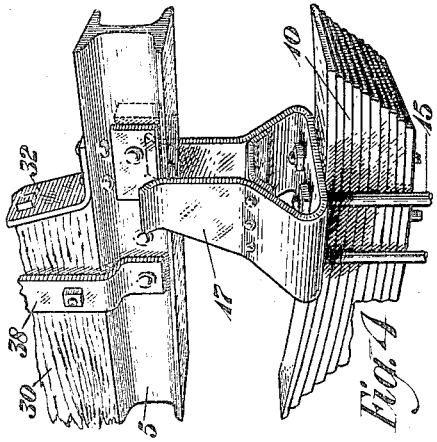
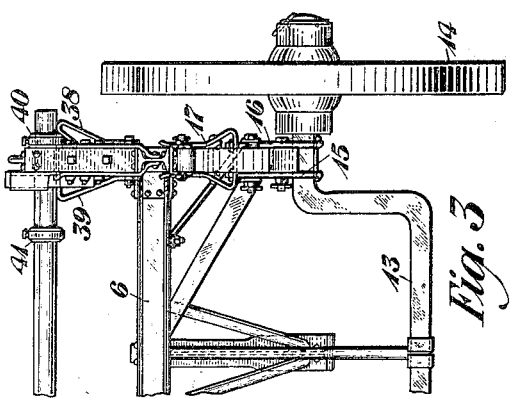
INVENTOR.
T. C. Smith
BY
ATTORNEY Patented Nov. 28, 1922.

1,436,733

UNITED STATES PATENT OFFICE.

TEMPLE C. SMITH, OF EAST ORANGE, NEW JERSEY, ASSIGNOR TO AMERICAN TELEPHONE AND TELEGRAPH COMPANY, A CORPORATION OF NEW YORK.

CARRIAGE FOR CONVEYING DRUMS OF ELECTRIC CABLES.

Application filed April 29, 1919. Serial No. 293,504.

*To all whom it may concern:*

Be it known that I, TEMPLE C. SMITH, residing at East Orange, in the county of Essex and State of New Jersey, have invented certain Improvements in Carriages for Conveying Drums of Electric Cables, of which the following is a specification.

This invention relates to improvements in spring mechanisms for use in connection with vehicles, and more particularly with vehicles for conveying drums or reels of electrical transmission cable.

One of the principal objects of the invention consists in providing a structure that will prevent excessive depression of the springs of said vehicles during the transportation of cable reels. Another object consists in providing resilient members associated with the springs which will prevent lateral displacement of the side frame members of the vehicle, caused by the side swing of the mounted cable reel, during haulage over rough or uneven roads. Other and further objects of the invention will be clear when considered in connection with the following detailed description and attached drawing.

In the annexed drawing, in which like characters represent like parts throughout, Figure 1 is a side elevation of the vehicle. Fig. 2 is a top plan view thereof; Fig. 3 is a rear elevation, and Fig. 4 is a detailed view of a section of the frame showing one of its cooperating guide members.

In carrying out the invention, a carriage frame is provided comprising two long steel channels or I-beams 5, extending lengthwise of said carriage, and forming the sides thereof. The carriage frame is open at its rear end, and at its forward portion a transverse I-beam 6 is connected to the members 5 by means of plates 7 which secure said beams to each other.

Secured to the lower flange portions of the I-beams 5 by riveting or in any other suitable manner, are depending members in the form of spring-guides 8 and 9. These guide members are provided with downwardly extending arms, which furnish a housing for semi-elliptical springs 10. The ends of said springs 10 terminate in hooked portions, the upper faces of which contact with the lower surfaces of said spring guides and furnish a support for the frame. The springs 10 are allowed to move in a transverse or longitudinal direction within the guides 8 and 9. To prevent displacement of the spring from the guide members there are provided bolts 11 and 12. The running-gear of the drum carriage comprises a bell-crank or underslung axle 13 of general U-shaped form provided with outwardly extending portions terminating in axle-spindles upon which are mounted wheels 14, 14 in the usual manner. U-bolts 15 and 16 embrace each of the outwardly extending portions of the axle 13, and at their upper extremities are bolted and clamped to frame guides 17, which rest upon the upper surfaces of springs 10. The frame guides 17 co-operate with the lower flanges and form a seat for the I-beams 5, as more clearly shown in Fig. 4. When a cable reel is being transported in this vehicle, the frame guides 17 function to prevent substantial side motion of said I-beams 5, and also prevent the springs 10 from being depressed to any large degree when the vehicle passes over holes in the road, and the breaking of said springs is thereby avoided. A spring block 18, provided at its underside with a cut-away portion, is adapted to fit upon the outwardly extending portions of the axle 13. The springs 10 rest upon the upper surfaces of the blocks 18, which co-operate to furnish a bearing surface for said springs. The spring-blocks 18 are provided with apertures to which one end of draw-bars 19 are secured, while the other ends of said bars are secured to spring guides 9. Steel rods 20 are also fixed at one of their ends to a common point with said draw-bars 19, and at their other ends are secured at 25. To the spring guides 9 are also bolted, or otherwise suitably secured, members 21. These may be made from steel pipe or the like. To the approximate center of the axle 13 is strapped or secured a forwardly extending bracing member 22. This member serves to keep the axle 13 in place. Fixed to the members 5, which form the sides of this trailer carriage, are converging channel members 23 and 24. These converging members, together with the members 21 and 22, meet at a common point and form a tongue 25. Coupling plates 26 are secured to the tongue member 25 and are provided with coinciding apertures 27 through which a pin 28 may be inserted. A shoe-member 29 is associated with the tongue 25 and may be of the general configuration shown, its bottom portion being preferably of such angular form that it rests in a flat position upon the ground when the tongue is lowered. The tongue is preferably of such length that, when the trailer is loaded and said tongue lowered, the center of gravity of the reel will be between the axle and the tongue.

At the rear end of each of the I-beams 5 are blocks 30 preferably of hard wood. These blocks are held in position by metal strips 31 and 32, said strips being bent at their lower ends at substantially right angles to their main portions, which extend in a general vertical direction therefrom. The lower ends of the strips 31 and 32 are secured to the beams 5, and their upper ends are formed to correspond to the curvilinear surfaces of hook portions 33 and 34 provided on a carrier member 35 to which they are riveted or otherwise fixed. The hook portions 34 are provided with apertures for the reception of pins 36, and corresponding apertures are also provided in the carrier members 35 and blocks 30, whereby said pins may be seated. The carrier members 35, including their hook portions 34, are adapted to hold spindles 37 upon which a cable reel may be mounted in position, and, by means of the pins 36 said spindle is retained in place, as will later be described. Fixed to the outside of the blocks 30, and to the web-portion of the channel beams 5, are saddle brackets 38 which co-operate with the carrier members 35 to prevent excessive sidewise motion and also form a bearing surface for the extremities of the spindle 37 when it is in position. Additional saddle brackets 39 are fixed to the inner sides of the blocks 30, and these also co-operate in the afore-mentioned manner. The spindle 37 is equipped at both ends with collars 40 and 41 which are fixed thereto by any suitable means, such as set screws. The collars 40 are adapted to fit between the saddle members 35 and saddle brackets 38. The collars 41 are contiguous to either side of the cable reel and co-operate with collars 40 to prevent substantial lateral movement of the reel or the spindle upon which it is mounted when in position on the trailer.

The blocks 30 are provided on both of their sides with rectangular plates 42 which are secured in any suitable manner thereto. Affixed to the plates 42, preferably by bolts, are upwardly extending arms 43 provided with braces 44. These braces are attached at one end of the upper portions of the arms 43 and extend, as shown in the present instance, diagonally to the top part of metal strips 45. The metal strips 45 are attached to either side of the blocks 30 and to the web portion of the channel irons 5. It is preferred to associate the braces 44 with the strips 45 which are attached to the outer sides of block 30, and, in order that said braces may function properly, the cutaway portion having a shoulder which bears upon an upper corner of the metal strip 45, thereby producing the supporting medium for the brace 44. The arms 43, together with their bracing members, are readily collapsible and by pushing the bracing members 44 outwardly the arms 43, including said braces, are allowed to drop downwardly. Said arms and braces are used only in connection with large cable reels whose diameter is too great to allow the spindles on which said reels are mounted to be engaged by the hook portions 33 as will appear presently.

When it is desired to load a cable reel upon the trailer, the pins 36 are withdrawn from their apertures in the front hooks 34 and the spindle 37 is removed from its position on the trailer. The set screws which secure the collars 40 and 41 on the spindle are loosened and said collars are removed therefrom. The spindle is then inserted through a hole provided in the reel which serves as an axis or a journal therefor, and the collars 40 and 41 are replaced on the spindle, one each side of the cable reel to keep it in place on said spindle, and the other two collars are so positioned upon the spindle that they will lie between the carrier members 35 and resilient members 39, as previously explained. A rope is passed through the space provided by the coupling plate 26 and its pin and is tied. The tongue is raised to a position of balance, and the rear part of the trailer is accordingly lowered and maneuvered so that its rear hooks 33 may engage with the ends of the spindle extending through the cable reel. After the ends of the spindle have been engaged by the rear hooks 33, the spindle functions as a journal for the cable reel and it is rolled forwardly along the carrier members 35 to a position of balance in the front hooks 34, whereupon it is held in place by the pins 36.

Should the cable reel be of a large diameter so that the ends of the spindle extending through said reel be too high to engage with the rear hooks 33, or if unevenness of ground renders it more expedient, the spindle may be engaged by the arm 43 and the cable reel is rolled thereover and into the front hooks 34 in a manner similar to that previously described in connection with the reels of smaller diameter.

When the cable reel is in place upon the trailer, said trailer may be transported to the location desired by attaching it to the rear end of a truck by means of a coupling or in any other suitable manner. The cable may be unloaded from the trailer in a manner reverse to that described in connection with its loading. Should it be desired to haul the cable from its reel for the purpose of aerial or underground installation, the wheels of the trailer are suitably blocked and braces applied to the rear of the springs and the cable is hauled from the reel in a manner well understood.

By means of this invention a cable trailer is provided which is capable of loading and transporting cable drums of various sizes, and which is adapted also to the purpose of paying out the cable without the use of jacks.

From the foregoing it is thought that the construction, operation and many advantages of the herein described invention will be apparent to those skilled in the art without further description, and it will be understood that various changes in the size, shape, proportion and minor details of construction, may be resorted to without departing from the spirit or sacrificing any of the advantages of the invention.

Having thus described the invention, what it is desired to secure by Letters Patent is:

1. A carriage comprising a frame including side channel members extending longitudinally of said carriage, running gear including an axle member, springs interposed between said axle member and each of the side channel members of the frame, clips for securing the springs to the axle member, and guides fixedly attached to said clips, said guides having resilient arms slidably coperating with the lower portion of the side channel members of said frame to prevent lateral displacement thereof.

2. A carriage comprising a frame including side channel members extending longitudinally of said carriage, running gear including an axle member, springs interposed between said axle member and each of the side channel members, guide members affixed to said springs and having resilient arms diverging on either side of the frame to prevent lateral displacement and resist vertical movement of the side channel members during the yield of said springs, and clips for fixedly attaching the guide and spring members to said axle.

3. A carriage for conveying cable drums comprising a frame including side channel members extending longitudinally of said carriage, running gear including an axle member, springs interposed between said axle member and each of the side channel members, guide members affixed to said springs and having resilient arms diverging on either side of the side channel members to prevent lateral displacement and resist vertical movement of the side channel members during the yield of said springs, reinforcing means for said guide members, and clips for fixedly attaching the guide and spring members to said axle.

4. A carriage for conveying cable drums, a frame including side channel members extending longitudinally of said carriage, running gear including an axle member, springs interposed between said axle member and each of the side channel members, guide members affixed to said springs and having resilient arms extending upwardly on either side of the channel members to prevent lateral displacement and resist vertical movement of said frame members during the yield of said springs, means affixed to said channel members for supporting said springs, reinforcing means for said guide members, and clips for fixedly attaching the guide and spring members to said axle.

In testimony whereof, I have signed my name to this specification this 28th day of April, 1919.

TEMPLE C. SMITH.